US009906821B1

(12) United States Patent
Cain et al.

(10) Patent No.: US 9,906,821 B1
(45) Date of Patent: Feb. 27, 2018

(54) PACKET REORDERING SYSTEM

(71) Applicant: Cisco Technology, Inc., San Jose, CA (US)

(72) Inventors: Harel Cain, Jerusalem (IL); Michal Devir, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/243,988

(22) Filed: Aug. 23, 2016

(51) Int. Cl.
*H04N 21/236* (2011.01)
*H04N 21/222* (2011.01)
*H04N 21/8358* (2011.01)
*H04N 21/2343* (2011.01)

(52) U.S. Cl.
CPC ... *H04N 21/23608* (2013.01); *H04N 21/2221* (2013.01); *H04N 21/23439* (2013.01); *H04N 21/8358* (2013.01)

(58) Field of Classification Search
CPC ......... H04N 21/23608; H04N 21/2221; H04N 21/23439; H04N 21/8358
See application file for complete search history.

(56) References Cited

U.S. PATENT DOCUMENTS

| 7,305,691 | B2 | 12/2007 | Cristofalo |
| 8,611,531 | B2 | 12/2013 | Joseph et al. |
| 8,850,590 | B2 | 9/2014 | Kellerman |
| 8,995,711 | B2 | 3/2015 | Thorwirth |
| 9,148,707 | B2 | 9/2015 | Dilorenzo |
| 9,363,209 | B1* | 6/2016 | Akins, III ........... H04L 49/9057 |
| 2010/0100742 | A1 | 4/2010 | Courington et al. |
| 2011/0280434 | A1 | 11/2011 | Mamidwar et al. |

(Continued)

FOREIGN PATENT DOCUMENTS

| CA | 2876390 | 1/2014 |
| EP | 1889483 | 8/2010 |
| WO | 2004/012455 | 2/2004 |

OTHER PUBLICATIONS

De Cock, Jan et al.; An Industry-Level Blu-Ray Watermarking Framework (2015), Multimedia Tools Appl. 74, 18 (Sep. 2015), 8079-8101. DOI=http://dx.doi.org/10.1007/s11042-014-2042-y.

(Continued)

*Primary Examiner* — Pankaj Kumar
*Assistant Examiner* — Alexander Boyd
(74) *Attorney, Agent, or Firm* — Samuel M. Katz

(57) ABSTRACT

In one embodiment, a method for reordering video packets from a multiplexed video bitstream is implemented on a computing device and includes: defining a current program identifier (PID), receiving the video packets, where each of the video packets is associated with an associated PID and a next-PID indication, for each video packet from among the received video packets, checking whether the associated PID is equal to the current PID, upon determining that the associated PID is equal to the current PID, appending the video packet as an output video packet to a reordered video bitstream, upon determining that the associated PID is not equal to the current PID, queueing the video packet as a queued video packet in a PID queue associated with the associated PID, and updating the current PID in accordance with the next-PID indication from a most recently appended output video packet in the reordered video bitstream.

18 Claims, 6 Drawing Sheets

(56) References Cited

U.S. PATENT DOCUMENTS

| | | | | |
|---|---|---|---|---|
| 2012/0320910 A1* | 12/2012 | Ziegler | .................. | H04L 47/34 |
| | | | | 370/389 |
| 2014/0160935 A1* | 6/2014 | Zecharia | ................. | H04L 47/34 |
| | | | | 370/235 |
| 2014/0259086 A1* | 9/2014 | Wajs | ................ | H04N 21/23608 |
| | | | | 725/116 |
| 2015/0092881 A1* | 4/2015 | Hwang | ................ | H04N 21/238 |
| | | | | 375/295 |

OTHER PUBLICATIONS

Wikipedia; MPEG Transport Stream (2016) Can be seen at: https://en.wikipedia.org/wiki/MPEG_transport_stream.

\* cited by examiner

PACKET REORDERING SYSTEM

FIELD OF THE INVENTION

The present invention generally relates to reordering multiplexed packets.

BACKGROUND OF THE INVENTION

Forensic watermarking for the identification of specific versions of video content is known in the art. According to one method for forensic watermarking, primary and secondary video program identifiers (PIDs) are used at a video broadcast headend to facilitate the insertion of forensic watermarks in an encoded video content item. Typically, most of the original video stream before watermark embedding is broadcast as a "primary video PID". At least two varying versions of watermarks are generated based on each of a series of small portions removed from the primary video PID. The series of at least two alternate watermarked portions of the video content item is broadcast using the secondary video PIDs. A high number of different forensic watermarks may therefore be effectively created by interleaving among the alternate watermarked versions according to some scheme (such as, for example, according to the key management of cryptoperiods of a conditional access system), such that a final forensic watermark is formed by a concatenation of the interleaved watermarked versions in the rendered content.

Generating the watermarks by removing portions of the primary video PID and preparing corresponding alternate versions for the secondary video PIDs to be added into the stream is generally impractical to perform post-multiplexing, due to the size of a multiplexed video stream (which typically includes other PIDs as well) and the fact that the multiplexed video stream is often scrambled. Accordingly, the portions of the primary video PID to be watermarked are typically replaced by data packets from the secondary video PID after encoding, and before multiplexing. The data packets from the primary and secondary video PIDs are then multiplexed and broadcast to receiving devices for rendering. The rendering device (e.g., set-top box (STB), smart TV, personal computer, etc.), inserts one of the alternate versions of watermarks into each of a series of insertion points in the primary PID stream as the primary PID stream is rendered.

The specific alternate version of a watermark to be embedded is determined according to one or more decryption keys on the rendering device. For example, the packets of the secondary video PIDs may be encrypted using a series of encryption keys, such that different decryption keys are used to decrypt each of the secondary video PIDs. The series of embedded alternate watermarks therefore forms a forensic watermark according to the specific order of decryption keys used to decrypt the watermarked portions, where the specific order itself is a function unique to the rendering device, e.g., the ID of a set-top box. The forensic watermark may then be used to identify the rendering device for a given item of rendered video content.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
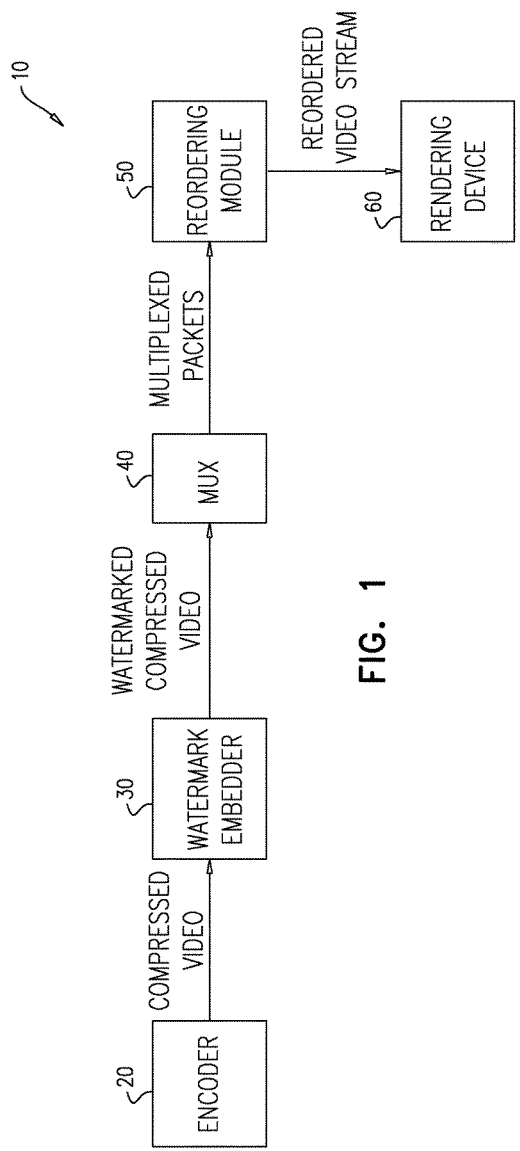
FIG. 1 is a schematic illustration of an exemplary video watermarking with packet reordering system, constructed and operative in accordance with embodiments described herein.

A method for reordering video packets from a multiplexed video bitstream is implemented on a computing device and includes: defining a current program identifier (PID), receiving the video packets, where each of the video packets is associated with an associated PID and a next-PID indication, for each video packet from among the received video packets, checking whether the associated PID is equal to the current PID, upon determining that the associated PID is equal to the current PID for a given video packet according to the checking, appending the given video packet as an output video packet to a reordered video bitstream, upon determining that the associated PID is not equal to the current PID for a given video packet according to said checking, queueing the given video packet as a queued video packet in a PID queue associated with the associated PID, and updating the current PID in accordance with the next-PID indication from a most recently appended output video packet in the reordered video bitstream.

A method for embedding a forensic watermark in a video content item is implemented on a computing device and includes: encoding the video content item, where packets of the encoded video content item are associated with a primary program identifier (PID), generating at least two alternate versions of portions of the encoded video content item, where packets of each of the at least two alternate versions are associated with a secondary PID, adding a next-PID indication to each of the packets associated with a primary or secondary PID, where the next-PID indication indicates which of the primary and secondary PIDs is associated with a next packet according to an original order, multiplexing the encoded video content item and the at least two alternate versions to produce a multiplexed video bitstream of video packets, where the multiplexing maintains the original order among the video packets associated with a same PID in the multiplexed video bitstream, defining a first output PID as either the primary PID or one of the at least two secondary PIDs, reordering the multiplexed video bitstream to produce an output video bitstream in accordance with the first output PID and the next-PID indication for each of the packets, and sequentially processing the output video bitstream to provide a watermarked video content item by outputting the packets associated with the primary PID interleaved with selected secondary PID packets, where the selected secondary packets are selected from the packets associated with one of the secondary PIDs according to a conditional access scheme.

Description

As noted hereinabove, the rendering device may be effective to reconstruct a full video bitstream out of a combination of the primary video PID and one of the secondary video PIDs. It will be appreciated by one of ordinary skill in the art that, in order to facilitate the embedding of the packets from the secondary video PIDs, the primary and secondary PIDs used to reassemble a single video bitstream, the rendering device may need to process the packets of the different PIDs generally according to the order in which the packets are to be rendered.

However, the packets in question are associated with different PIDs, and existing transport stream multiplexers ("Muxes") may not be operative to maintain the relative order of packets across the PIDs in question, but rather only to maintain the packet order within each PID separately. It will be appreciated that existing muxes may not necessarily have been designed to handle such a use case where multiple PIDs are eventually used to transport a single bitstream that needs to be correctly reassembled.

In accordance with embodiments described herein, the lack of relative order that may be introduced by a Mux may be compensated for without modifying the Mux and/or the MPEG transport stream standard. Reference is now made to FIG. 1, which illustrates a schematic illustration of an exemplary video watermarking with packet reordering system 10, constructed and operative in accordance with embodiments described herein. System 10 comprises encoder 20, watermark embedder 30, mux 40 and reordering module 50.

Encoder 20 may be implemented using any known suitable standard for video encoding, such as, but not limited to, H.262, H.264, or H.265. Watermark embedder 30 may be an application implemented in software or in hardware, and operative to generate secondary video PIDs from the compressed video produced by encoder 20, thereby producing watermarked compressed video that is forwarded to mux 40. Mux 40 may be implemented as any suitable known or proprietary transport stream multiplexer, operative to multiplex an incoming bitstream for broadcast from a video headend. In accordance with an exemplary embodiment described herein, Mux 40 is operative to multiplex MPEG transport streams. However, it will be appreciated by one of ordinary skill in the art that that the methods described herein may also be implemented for use with other transport streams as well.

Reordering module 50 may be an application implemented on a computing device in software or hardware, and operative to be executed by a processor on the computing device to reorder the multiplexed packets of the primary and secondary video PIDs produced by mux 40 to reassemble the combined primary/secondary PID bitstream associated with a video content item in relative order. In accordance with embodiments described herein, encoder 20, watermark embedder 30, and mux 40 are implemented as components of a video headend. In accordance with some embodiments described herein, reordering module 50 may also be implemented as a component of a video headend, operative to reorder multiplexed packets received from mux 40. In accordance with other embodiments described herein, reordering module 50 may be implemented as a component of a post-broadcast receiving device, such as, for example, rendering device 60. Rendering device 60 may be implemented as, for example, an STB, smart TV, personal computer, etc.

Figure 2A:
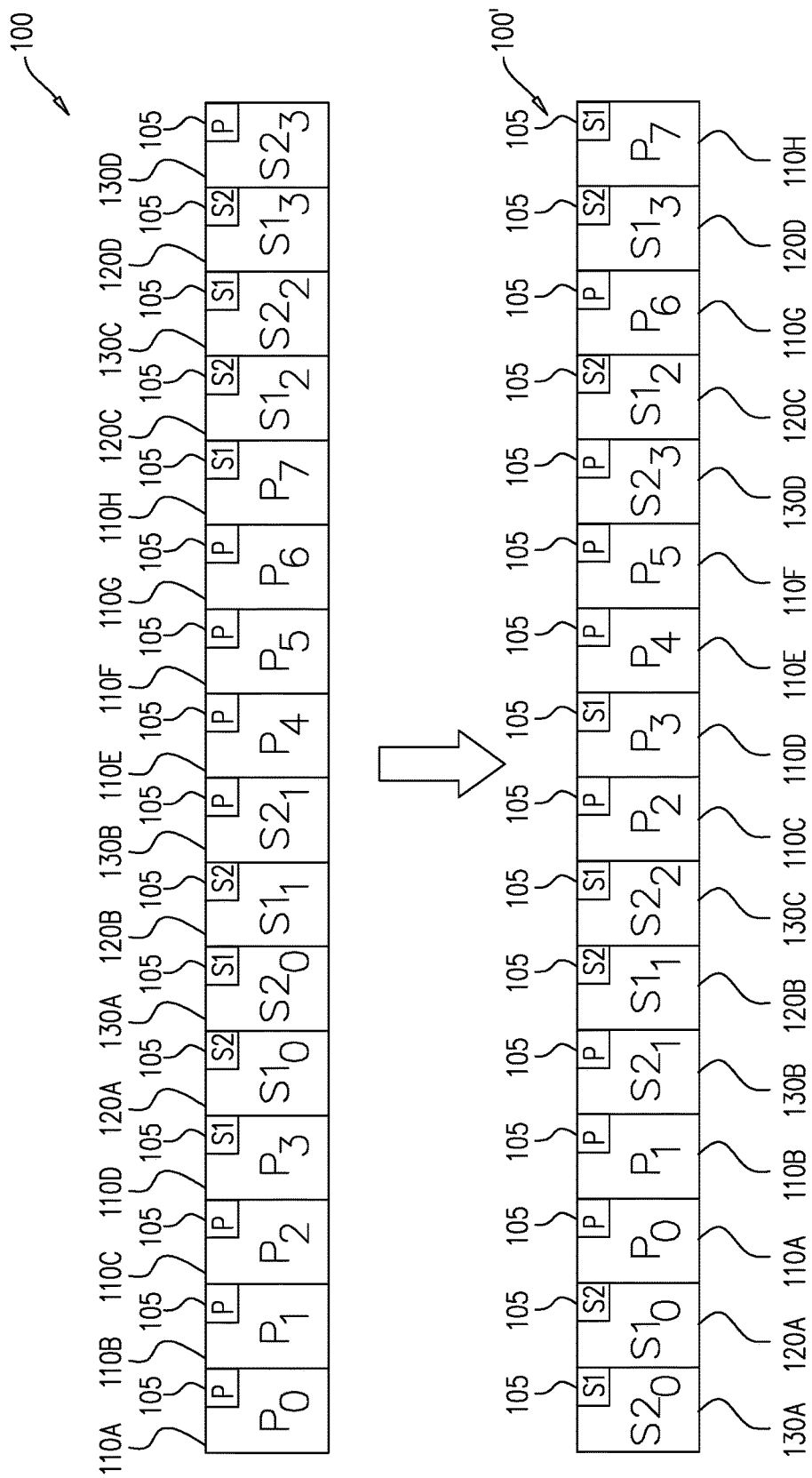
FIGS. 2A-D are schematic illustrations of a disposition of packets as they are reordered by the reordering module of FIG. 1.

Reference is now made to FIGS. 2A-D which are schematic illustrations of an exemplary disposition of the packets of the primary and secondary video PIDs as the packets are reordered by reordering module 50 (FIG. 1). FIG. 2A depicts an exemplary watermarked packets bitstream 100 as produced by watermark embedder 30 (FIG. 1). Watermarked packets bitstream 100 comprises primary video PID packets 110A-H; secondary video packets 120A-D; and secondary video PID packets 130A-D. In accordance with the exemplary embodiment of FIG. 2A, two secondary video PID packets 120/130 may be embedded after every four primary video PIDs 110. Accordingly, in order to properly render the associated watermarked video content item, after rendering primary video PID packets 110A, 110B, 110C, and 110D, rendering device 60 may embed either secondary video PID packets 120A and 120B, or secondary video PID packets 130A and 130B. Similarly, after rendering primary video PID packets 110E, 110F, 110G, and 110H, rendering device 60 may embed either secondary video PID packets 120C and 120D, or secondary video PID packets 130C and 130D.

It will be appreciated by a person of ordinary skill in the art that the relative order of primary video PID packets 110 and secondary video PID packets 120/130 as presented in FIG. 2A is exemplary; the depiction of bitstream 100 as being comprised of a repeating pattern of four packets of primary video PID packets 110 followed by four secondary video PID packets 120/130 is provided as a simplified representation of bitstream 100 for the purposes of illustration. In practice, the percentage of primary video PID packets may be significantly higher. Furthermore, it will be appreciated that the order of the packets of the primary and secondary PIDs is in accordance with a known structure or sequencing algorithm.

It will also be appreciated by a person of ordinary skill in the art that transport stream multiplexers are not typically configured to maintain the relative order of individual packets from different PIDs. Accordingly, as depicted in multiplexed packets bitstream 100', once multiplexed by mux 40, primary video packets 110 and secondary video packets 120/130 may no longer be ordered in the same relative order as in bitstream 100.

Therefore, in accordance with embodiments described herein, watermark embedder 30 is configured to add "next-PID" markers 105 to at least some of the packets of primary video PIDs 110 and secondary video PIDs 120/130 in order to facilitate downstream reordering by reordering module 50. Such markers may be added as necessary using MPEG adaption fields. Next-PID markers 105 provide an indication of the PID type to follow a current packet in bitstream 100. For example, next-PID marker 105, "P", in primary video PID packet 110A, indicates that the next PID type to follow is a primary video PID, as per primary video PID 110B. Next-PID marker 105, "S1", for primary video PID packet 110D indicates that the next PID type to follow is a type S1 secondary video PID, as per secondary video PID 120A; and next-PID marker 105 for secondary video PID packet 120A indicates that the next PID type to follow is a type S2 secondary video PID, as per secondary video PID 130A. As described hereinbelow, reordering module 50 may use next PID markers 105 to reorder the associated packets and reassemble bitstream 100 from bitstream 100'.

In accordance with embodiments described herein, it may not be necessary to add an explicit next-PID marker to each packet in bitstream 100. Bandwidth may be conserved by defining one or more default next PIDs in the absence of an explicit next-PID marker 105. For example, it will be appreciated that in operation the majority of the packets in bitstream 100 may be associated with primary video PIDs 110. Accordingly, the absence of a next PID marker 105 may be defined as indicative of the next packet being associated with a primary video PID 110.

Alternatively, a default next-PID may be defined on a per PID type basis. For example, the default next-PID for primary video PID packets 110 may be for primary video PID 110. The default next-PID for secondary video PID packets 120 may be for secondary video PID 130. Depending on how many secondary PID packets are used to embed a watermark, the default next PID for secondary video PID packets 130 may be defined for either secondary video PID 120 or primary video PID 110. The default next-PIDs to be used, and to which specific PIDs these defaults apply, may be configurable, as long as the configuration unambiguously indicates a single next-PID type for a given packet.

Figure 2B:
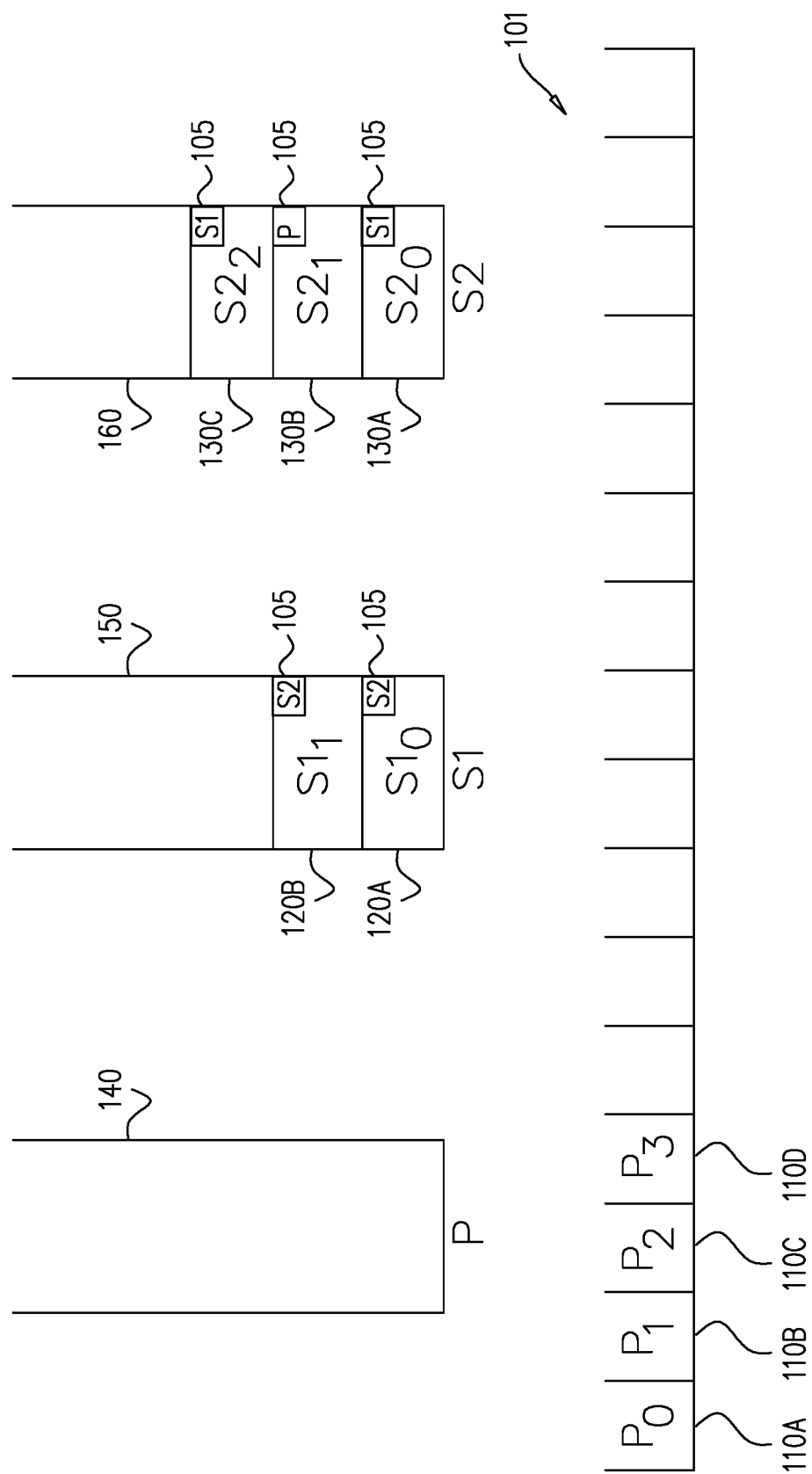

As depicted in FIG. 2B, reordering module 50 may employ primary PID queue (herein labeled "P") 140, first secondary PID queue (herein labeled "S1"), and second secondary PID queue (herein labeled "S2") to facilitate reordering bitstream 100' into reordered bitstream 101. Reordering module 50 may use PID queues 140/150/160 to temporarily hold packets from bitstream 100' if they are not associated with the next PID.

In accordance with the exemplary embodiment of FIGS. 2A-D, reordering module 50 may be configured such that the next-PID is defined as the primary video PID when beginning the reordering of bitstream 100', i.e., the first packet to be placed in bitstream 101 is expected to be a primary video PID packet 110. However, the first packet in bitstream 100' is secondary video PID packet 130A, which is not associated with the PID type of the next-PID. Accordingly, reordering module 50 does not place secondary video PID packet 130A immediately in bitstream 101, but rather places it in secondary PID queue 160. The next packet in bitstream 100' is secondary PID packet 120A, whose PID type also differs from the next-PID. Accordingly, reordering module 50 places it in secondary PID queue 150.

The next packet in bitstream 100' is primary video PID packet 110A. Since the associated PID type matches the next-PID, reordering module 50 places primary video PID packet 110A as the first packet in bitstream 101. The next PID, as indicated by next-PID marker 105 in primary video PID packet 110A, remains the primary video PID. Accordingly, reordering module 50 also places the next packet, primary video PID packet 110B, in bitstream 101. It will be appreciated that while there is an explicit next-PID marker 105 in primary video PID packet 110A, the embodiments described herein also support the use of an implicit next-PID marker, as discussed hereinabove.

The next-PID, as indicated by next-PID marker 105 in primary video PID packet 110B, remains the primary video PID, which does not match the PID type of the next three packets in bitstream 100', secondary video PID packet 130B, secondary video PID packet 120B, and secondary video PID packet 130C, which are placed in secondary PID queues 150 and 160 according to their associated secondary PID types.

The next two packets in bitstream 100' are primary video PID packets 110C and 110D, whose associated PID types match the next-PID, i.e. primary video PID. Accordingly, reordering module 50 places primary video PID packets 110C and 110D in bitstream 101. At this point the contents of bitstream 101 and secondary PID queues 150 and 160 are as depicted in FIG. 2B.

The next-PID as indicated by primary video PID packets 110D is the first secondary video PID (S1). Reordering module 50 then checks for packets associated with the next PID in the associated PID queue, i.e., secondary PID queue 150. Reordering module 50 then pops the next packet from the associated queue, i.e., secondary video PID packet 120C from secondary PID queue 150, and places it into bitstream 101. It will be appreciated that queues 140, 150 and 160 are configured to pop packets according to a first-in-first-out scheme.

The next-PID as indicated by secondary video PID packet 120C is the second secondary PID (S2). Accordingly, reordering module 50 places secondary video PID packet 130C from secondary PID queue 160 into bitstream 101. The next-PID as indicated by next-PID marker 105 in secondary video PID packet 130C is the first secondary PID (S1). Accordingly, reordering module 50 places secondary video PID packet 120D from secondary PID queue 150 into bitstream 101. The next-PID as indicated by next-PID marker 105 in secondary video PID packet 120D is the second secondary PID (S2). Accordingly, reordering module 50 places secondary video PID packet 130D from secondary PID queue 160 into bitstream 101. At this point the contents of bitstream 101 and PID queues 140, 150, and 160 are as depicted in FIG. 2B. Primary PID queue 140 and secondary PID queue 150 are empty, and secondary PID queue 160 has one packet, secondary PID packet 130C.

The next-PID as indicated by next-PID maker 105 in secondary video PID packet 130C is the primary video PID. Accordingly, reordering module 50 first checks if there are any packets in the associated PID queue, i.e., primary PID queue 140. Since there are no packets in primary PID queue, reordering module 50 checks the PID type of the next packet in bitstream 100', primary video PID packet 110E. Since primary video PID packet 110E is a match for the next-PID, reordering module 50 places it in bitstream 101. The next-PID as indicated by next-PID marker 105 in secondary video PID packet 130C remains the primary video PID. As the next packet in bitstream 100', primary video PID packet 110F is associated with the primary video PID, reordering module 50 places it as well into bitstream 101.

The next-PID as indicated by next-PID marker 105 in secondary video PID packet 130C remains the primary video PID. However, as the next packet in bitstream 100' is secondary video PID packet 130D, reordering module 50 places it into secondary PID queue 160. Reordering module 50 then similarly places the next packet from bitstream 100', secondary video PID packet 120C into its associated PID queue, secondary PID queue 140. At this point the contents of bitstream 101 and PID queues 140, 150, and 160 are as depicted in FIG. 2B. It will be appreciated that the packets from bitstream 100' and PID queues 140/150/160 may continue to be placed into bitstream 101 in a generally similar manner until bitstream 100 has been reproduced in bitstream 101.

Figure 2C:
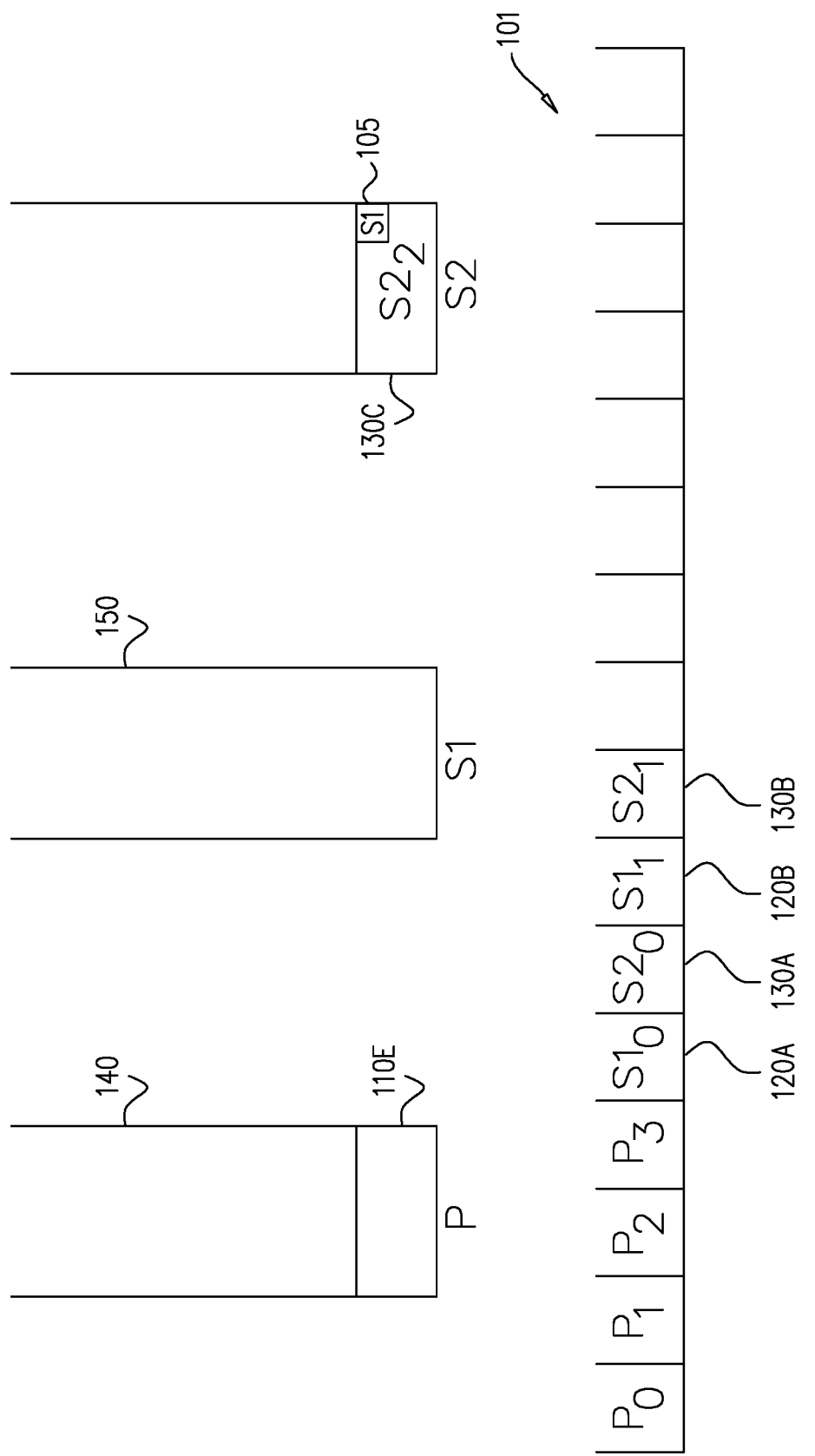
Figure 2D:
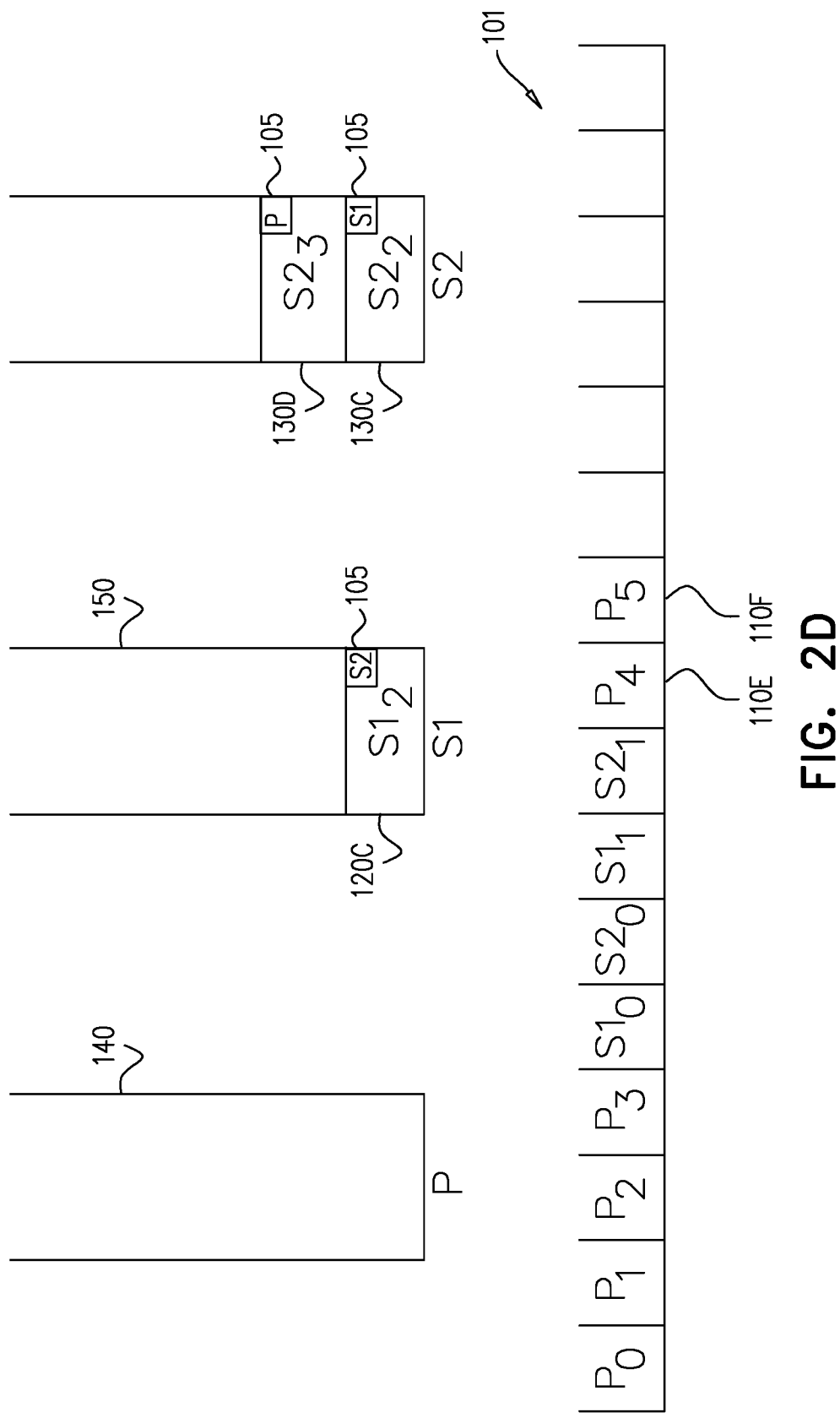
Figure 3:
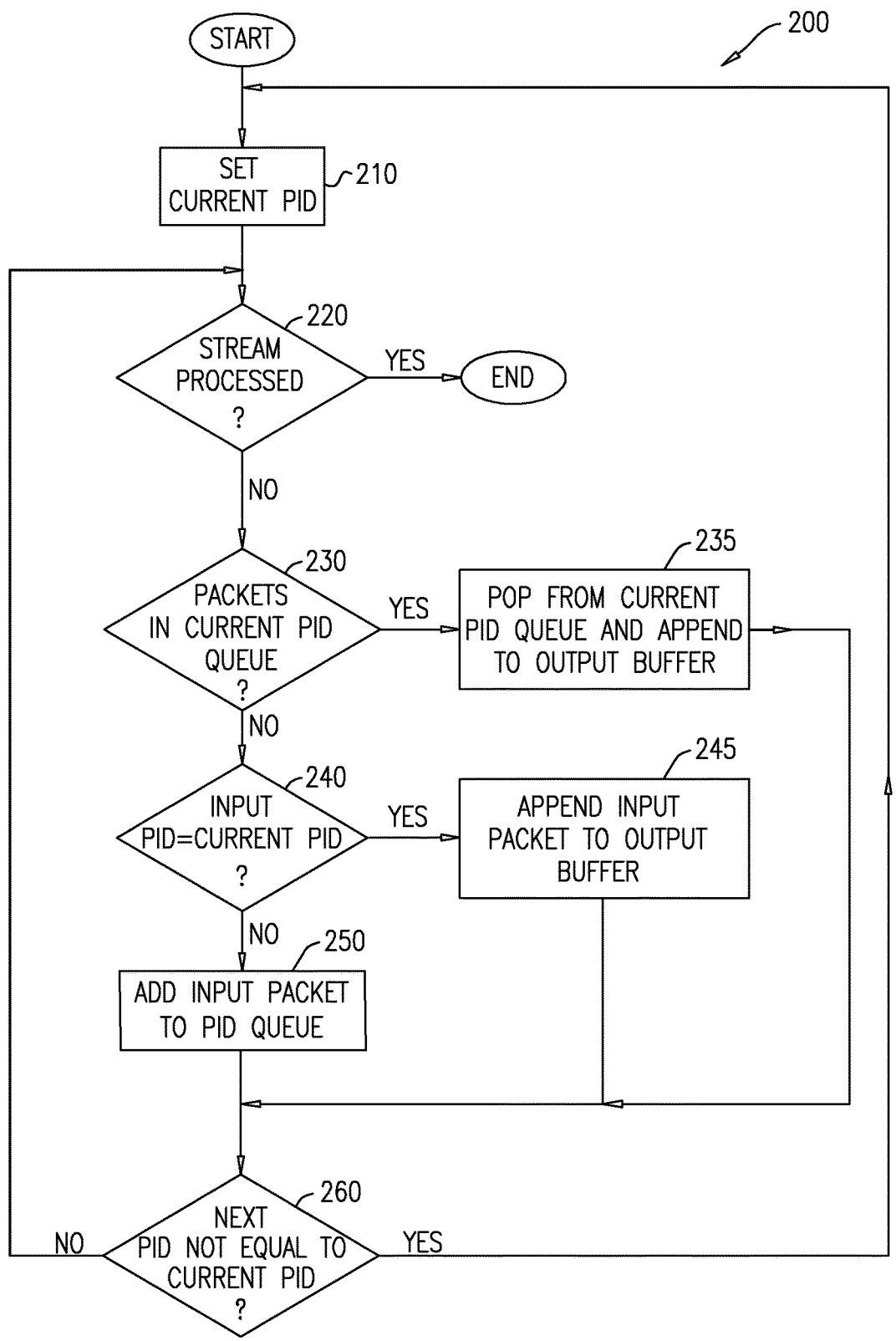
FIG. 3 is a flow chart of a packet reordering process to be performed by the reordering module of FIG. 1.

Reference is now also made to FIG. 3 which illustrates a flow chart of a packet reordering process 200 to be performed by reordering module 50 (FIG. 1), constructed and operative in accordance with embodiments described herein. Reordering module 50 may set (step 210) a current PID, i.e., the PID for which the next packet is to be placed into an output buffer (e.g., bitstream 101 from FIGS. 2B-D). For example, in the exemplary embodiment of FIGS. 2A-D the first packet in the input stream (i.e., bitstream 100) was primary video PID packet 110A. Accordingly, the current PID would be set to "primary video PID" to facilitate placement of a packet from the input buffer as the first packet in the output buffer. It will however, be appreciated that in some cases the current PID may be initialized as a secondary PID in order to embed a watermark in the first packet of the output stream.

If the input stream has already been processed in its entirety, including placement of packets from PID queues, such as, for example, PID queues 140, 150 and 160 in FIGS. 2B-D (step 220), process 200 ends. Otherwise, if there are packets in the current PID queue, i.e., if there are packets in the PID queue associated with the current PID (step 230), reordering module 50 may pop (step 235) the next packet from the current PID queue and place it into the output buffer. It will be appreciated that the PID queues are configured to pop packets according to a first-in-first-out scheme.

As described hereinabove, each packet to be reordered has at least an indication (either explicit, or as a defined default) of the next PID to be placed into the output buffer. If the next PID indicated by the currently processed packet (i.e., the next PID indicated by the packet that was placed into the output buffer in step 235) is not the same as the current PID (step 260), processing may return to step 210, and the current PID may be reset according to the next PID indicated by the currently processed packet. Otherwise, processing may return to step 220 to continue processing the input stream.

If the input PID, i.e., the PID of the next packet to be processed from the input stream, is the same as the current PID (step 240), then reordering module 50 appends (step 245) the next packet to be processed from the input stream to the output buffer. Otherwise, reordering module adds (step 250) the next packet from the input stream into its associated PID queue (e.g., a primary video PID packet would be added to the primary PID queue, a first secondary PID packet would be added to the S1 PID queue, etc.). From step 250, processing may then return to step 220.

If the next PID indicated by the packet that was appended to the output buffer in step 245 is not the same as the current PID (step 260), processing may return to step 210, and the current PID may be reset according to the next PID indicated by the packet appended in step 245. Otherwise processing may return to step 220 to continue processing the input stream.

It will be appreciated that the embodiments described herein provide an in-band marking scheme that facilitates the reordering of transport stream frames of multiple video PIDs back to their correct relative order after a Mux has corrupted that order. Accordingly, the embodiments provide a solution to a problem that would otherwise prevent forensic watermarking of broadcast video from being performed at the video headend, without necessitating changes in typical Mux behavior or the MPEG transport stream standard. The embodiments may therefore be implemented in a Mux-agnostic manner using existing Mux technologies.

It will also be appreciated that the embodiments described herein may require minimal additional bandwidth for implementation, since the next PID markers may be added to a relative minority of the packets.

It will further be appreciated that reordering module 50 (FIG. 1) may be implemented as a post-Mux headend component, a receiver side component, or as an intermediate component, for example, as part of a content distribution network.

It will further be appreciated that the embodiments described herein do not require downstream "housekeeping" functionality; the next PID markers do not have to be removed after reordering. Similarly, the marking may be non-obstructive, such that, even if future Mux products would be configured to maintain the relative order of multi-PID streams, the in-band marking scheme described herein may not need to be removed to accommodate such a configuration.

It will also be appreciated that reordering module 50 and process 200 may not necessarily be specifically limited to embodiments for the embedding of watermarks in video content. Reordering module 50 and/or process 200 may alternatively or additionally be implemented to support the reordering of any comingled multiple series of data packets where an order is maintained within a given series, but the relative order across the multiple series has presumably been corrupted. Similarly, while the embodiments of FIGS. 2A-D may be described in terms of two secondary PIDs, the embodiments described herein may also support reordering for three or more secondary PIDs. Furthermore, the embodiments described herein may also support reordering scenarios where there is only one secondary PID (or one secondary series of data packets). For example, a video stream may be partially encrypted to facilitate protection of a video content item without requiring intensive decryption processing on a receiving end. In such a case of "partial encryption" data in primary PID may be sent in the clear (i.e., unencrypted) and data in a secondary PID may be sent encrypted. After the packets from the primary and secondary PIDs are multiplexed, reordering module 50 may reorder the packets in accordance with their original relative order in order to facilitate assembly of the partially encrypted video stream on the receiving end.

It will be appreciated that the term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled"

and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for reordering video packets from a multiplexed video bitstream, the method implemented on a computing device and comprising:
defining a current program identifier (PID);
receiving said video packets, wherein each of said video packets is associated with an associated PID and a next-PID indication, wherein said next-PID indication indicates said associated PID for a next packet to follow a current packet, wherein for at least a first video packet of said video packets, said next-PID indication is an explicit next-PID marker in said at least a first video packet, and for at least a second video packet of said video packets, said next-PID indication is an implicit next-PID indication indicating a default associated PID for said next packet in the absence of said next-PID marker in said at least a second video packet; and
for each video packet from among said received video packets:
a) checking whether said associated PID is equal to said current PID;
b) upon determining that said associated PID is equal to said current PID for said video packet according to said checking, appending said video packet as an output video packet to a reordered video bitstream;
c) upon determining that said associated PID is not equal to said current PID for said video packet according to said checking, queueing said video packet as a queued video packet in a PID queue associated with said associated PID; and
d) upon determining that said current PID is different than said next-PID indication from a most recently appended said output video packet in said reordered video bitstream, updating said current PID in accordance with said next-PID indication from said most recently appended output video packet.

2. The method according to claim 1 and further comprising:
popping said queued video packet from said PID queue, wherein said PID queue is associated with said current PID according to said updating; and
appending said popped queued video packet as said output video packet to said reordered video bitstream.

3. The method according to claim 1 and wherein said PID queue is a first-in-first-out queue.

4. The method according to claim 1 and wherein said explicit next-PID marker is indicated in an MPEG TS adaptation field.

5. The method according to claim 1 and wherein:
said default associated PID is defined as said associated PID of said at least a second video packet.

6. The method according to claim 1 and wherein:
said default associated PID is defined as a different PID than said associated PID of said at least a second video packet, wherein said different PID is another PID associated with at least one of said video packets.

7. The method according to claim 1 and wherein:
said associated PID is associated with either a primary video PID or one of at least two secondary video PIDs, wherein said primary video PID is associated with a video content item and said at least two secondary video PIDs are associated with alternate versions of portions of said video content item for insertion within said video content item to produce a forensic watermark.

8. The method according to claim 1 and wherein:
said associated PID is associated with either a primary video PID or a secondary video PID, wherein said primary video PID is associated with unencrypted portions of a video content item and said secondary video PID is associated with at least one encrypted portion of said video content item.

9. The method according to claim 1 and wherein said computing device is a video rendering device.

10. The method according to claim 1 and wherein said computing device is a component of a video headend.

11. The method according to claim 1 and wherein said receiving comprises:
receiving said each of said video packets in a correct order relative to others of said received video packets with a same said associated PID.

12. A video broadcast system comprising:
a video headend operative to generate a multiplexed video bitstream from video packets, wherein each video packet of said video packets is associated with one of at least three program identifiers (PIDs), and wherein said each video packet is associated with a next-PID indication indicating which of said at least three PIDs is associated with a next video packet from among said video packets according to an original order, wherein said next-PID indication is added as an explicit next-PID marker to at least a first video packet, and for at least a second video packet of said video packets, said next-PID indication is an implicit next-PID indication indicating a default associated PID for said next packet in the absence of said next-PID marker in said at least a second video packet; and a reordering module operative to:
define a current PID from among said at least three PIDs based on said original order,
append a current PID video packet as an output video packet to a reordered output video bitstream, wherein said current PID video packet is one of said video packets associated with said current PID,
queue a non-current PID video packet to a PID queue, wherein said non-current PID video packet is one of said video packets that is not associated with said current PID, and said PID queue and said non-current PID video packet are associated with a same one of said at least three PIDs, and
update said current PID in accordance with said next-PID indication from a most recently appended output video packet.

13. The video broadcast system according to claim 12 and wherein said reordering module is further operative to:
pop said queued video packet from said PID queue, wherein said PID queue is associated with said updated current PID; and
append said popped queued video packet as said output video packet to said reordered video bitstream.

14. The video broadcast system according to claim 12 and wherein said video headend comprises:
a video encoder operative to encode said video packets;
a watermark embedder operative to generate at least two alternate versions of portions of an original video content item; and
a multiplexor operative to produce a multiplexed video bitstream, wherein said multiplexed video bitstream comprises primary video packets and secondary video packets, wherein said primary video packets are associated with said original video content item and a primary PID, and said secondary video packets are associated with said at least two alternate versions of portions and at least two secondary PIDs, wherein said primary and two secondary PIDs are said at least three PIDs.

15. The video broadcast system according to claim 14 and wherein said multiplexor is further operative to maintain said original order among said video packets associated with a same PID in said multiplexed video bitstream.

16. The video broadcast system according to claim 12 and wherein said reordering module is implemented as part of said video headend.

17. The video broadcast system according to claim 12 and where said reordering module is implemented in a video rendering device.

18. A method for embedding a forensic watermark in a video content item, the method implemented on a computing device and comprising:
generating an encoded video content item by encoding said video content item, wherein packets of said encoded video content item are associated with a primary program identifier (PID);
generating at least two alternate versions of portions of said encoded video content item to replace said portions of said encoded video content item, wherein packets of each of said at least two alternate versions are associated with one of at least two secondary PIDs;
defining a default next-PID for each of said primary PID and said at least two secondary PIDS, wherein said default next-PID indicates an expected PID associated with a next packet to follow a current packet from among said packets;
upon determining that a PID for said next packet according to an original order of said packets is different than a defined said default next-PID associated with said current packet, adding an explicit next-PID indication to said current packet, wherein said explicit next-PID indication overrides said default next-PID and indicates which of said primary and at least two secondary PIDs is associated with said next packet according to said original order of said packets;
multiplexing said encoded video content item and said at least two alternate versions to produce a multiplexed video bitstream of video packets, wherein said multiplexing maintains said original order among said video packets associated with a same PID in said multiplexed video bitstream;
defining a first output PID as either said primary PID or said one of at least two secondary PIDs;
reordering said multiplexed video bitstream to produce an output video bitstream in accordance with said first output PID and said next-PID indication for each of said packets; and
sequentially processing said output video bitstream to provide a watermarked video content item by outputting said packets associated with said primary PID interleaved with selected secondary PID packets, wherein said selected secondary PID packets are selected from said packets associated with said one of at least two secondary PIDs according to a conditional access scheme.

* * * * *